(12) United States Patent
Uta et al.

(10) Patent No.: US 11,970,580 B2
(45) Date of Patent: Apr. 30, 2024

(54) ROOM-TEMPERATURE-CURABLE ORGANOPOLYSILOXANE COMPOSITION FOR OIL SEAL, AND AUTOMOTIVE PART

(71) Applicant: SHIN-ETSU CHEMICAL CO., LTD., Tokyo (JP)

(72) Inventors: Akira Uta, Annaka (JP); Shigeki Yasuda, Annaka (JP); Tetsuro Yamada, Annaka (JP); Munenao Hirokami, Annaka (JP); Taiki Katayama, Annaka (JP); Takafumi Sakamoto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 211 days.

(21) Appl. No.: 17/602,682

(22) PCT Filed: Mar. 26, 2020

(86) PCT No.: PCT/JP2020/013634
§ 371 (c)(1),
(2) Date: Oct. 8, 2021

(87) PCT Pub. No.: WO2020/209083
PCT Pub. Date: Oct. 15, 2020

(65) Prior Publication Data
US 2022/0162393 A1    May 26, 2022

(30) Foreign Application Priority Data
Apr. 10, 2019 (JP) .................. 2019-074664

(51) Int. Cl.
| | |
|---|---|
| C08J 3/24 | (2006.01) |
| C08G 77/16 | (2006.01) |
| C08K 3/04 | (2006.01) |
| C08K 3/26 | (2006.01) |
| C08K 5/31 | (2006.01) |
| C08K 5/5419 | (2006.01) |
| C08K 5/544 | (2006.01) |
| C08K 9/04 | (2006.01) |
| C09K 3/10 | (2006.01) |

(52) U.S. Cl.
CPC .............. *C08G 77/16* (2013.01); *C08J 3/24* (2013.01); *C08K 3/04* (2013.01); *C08K 3/26* (2013.01); *C08K 5/31* (2013.01); *C08K 5/5419* (2013.01); *C08K 5/544* (2013.01); *C08K 9/04* (2013.01); *C09K 3/1018* (2013.01); *C08K 2003/265* (2013.01)

(58) Field of Classification Search
CPC . C08G 77/16; C08G 77/12; C08J 3/24; C08K 3/04; C08K 3/26; C08K 5/31; C08K 5/5419; C08K 5/544; C08K 9/04; C08K 2003/265; C08K 2201/014; C08K 5/5445; C08K 3/013; C09K 3/10; C09K 3/1018; C08L 83/04

USPC .......................................................... 524/588
See application file for complete search history.

(56) References Cited

U.S. PATENT DOCUMENTS

| | | | |
|---|---|---|---|
| 11,401,419 B2 * | 8/2022 | Uta ..................... | C09K 3/1018 |
| 2003/0069379 A1 | 4/2003 | Inoue et al. | |
| 2011/0009558 A1 | 1/2011 | Maliverney et al. | |
| 2015/0129127 A1 | 5/2015 | Ireland et al. | |
| 2015/0315438 A1 | 11/2015 | Sakamoto et al. | |
| 2016/0137872 A1 * | 5/2016 | Miyafuji ................ | C08L 71/02 |
| | | | 524/506 |
| 2019/0177542 A1 | 6/2019 | Uta et al. | |
| 2023/0146278 A1 * | 5/2023 | Fujiwara .............. | C09D 183/06 |
| | | | 525/477 |

FOREIGN PATENT DOCUMENTS

| | | |
|---|---|---|
| JP | 2003-119387 A | 4/2003 |
| JP | 2011-509317 A | 3/2011 |
| JP | 2016-8228 A | 1/2016 |
| JP | 2016-191061 A | 11/2016 |
| WO | WO 2014/097574 A1 | 6/2014 |
| WO | WO 2018/037682 A1 | 3/2018 |

OTHER PUBLICATIONS

English Translation of JP 2016-121262 (Year: 2016).*

(Continued)

*Primary Examiner* — Hannah J Pak
(74) *Attorney, Agent, or Firm* — Birch, Stewart, Kolasch & Birch, LLP

(57) ABSTRACT

A room-temperature-curable organopolysiloxane composition for an oil seal, wherein an organosilane compound containing a specific organo-oxymethyl group and represented by formula (1) below and/or a partial hydrolysis condensate of said compound is used as a curing agent (crosslinking agent), and an organic compound having a guanidine skeleton is added in combination as a curing catalyst. In the formula, each $R^1$ is independently a C1-12 unsubstituted or substituted monovalent hydrocarbon group, $R^2$ is a C1-12 unsubstituted or substituted monovalent hydrocarbon group, Y is a hydrolyzable group, and n is 0, 1 or 2. It is thus possible to obtain a cured product having good rubber properties, adhesiveness, and engine oil resistance after curing even without containing a metal-based catalyst:

(1)

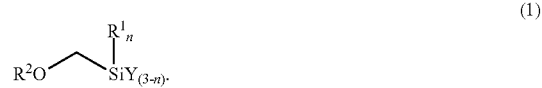

5 Claims, No Drawings

(56) References Cited

OTHER PUBLICATIONS

International Search Report for PCT/JP2020/013634 (PCT/ISA/210) dated Jun. 23, 2020.
Written Opinion of the International Searching Authority for PCT/JP2020/013634 (PCT/ISA/237) dated Jun. 23, 2020.

* cited by examiner

ROOM-TEMPERATURE-CURABLE ORGANOPOLYSILOXANE COMPOSITION FOR OIL SEAL, AND AUTOMOTIVE PART

TECHNICAL FIELD

The present invention relates to a room-temperature-curable organopolysiloxane composition for an oil seal, particularly to a room-temperature-curable organopolysiloxane composition for oil seal, that is favorably cured by condensation curing reaction, preferably dealcoholization-type condensation curing reaction, at room temperature (23° C.±5° C.) by moisture in the atmosphere without using a metal-based catalyst such as an organic tin catalyst or a titanium chelate catalyst that has been conventionally essential, and that provides a silicone rubber cured product (elastomeric organopolysiloxane cured product) having excellent adhesive properties, and an article such as an automotive part sealed with a cured product (silicone rubber) of the composition.

BACKGROUND ART

For seals around an automotive engine, oil-resistant gaskets and packing materials made of cork, organic rubber, asbestos, and the like have been conventionally used, but these have a disadvantage of their cumbersome inventory management and operation processes, and further, a drawback of their unreliable sealing performance. Therefore, for this type of application, a formed in place gasket (FIPG) system using a dealcoholization-type room-temperature-curable organopolysiloxane composition, which has little influence on the surrounding environment, is preferably employed as a liquid gasket.

Conventionally, dealcoholization-type room-temperature-curable organopolysiloxane compositions have poor reactivity without a catalyst, and thus it has been necessary to use a metal-based catalyst such as an organic tin catalyst or a titanium chelate catalyst to impart sufficient curability. However, due to the toxicity of organic tin compounds, the use of products containing the compounds may be restricted. In particular in EU countries, products with a ratio of more than 0.1% in terms of tin have not been able to be used since 2012. Furthermore, there is a possibility that dibutyltin compounds will be registered with the REACH Regulation in 2020. Thus, regulations on organic tin compounds are increasing year by year.

In addition, when the composition contains an organic tin compound, there is a problem that cracking occurs due to main chain cleavage of the organopolysiloxane, leading to a decrease in hardness with time, and when the composition contains an organotitanium compound, there is a problem that the curing rate is slow, or the cured product (rubber) is discolored with time.

Furthermore, since the curing agent (crosslinking agent) used in the dealcoholization-type room-temperature-curable organosiloxane composition is inferior in reactivity as compared with the curing agent used in that of a deoximation type, a deacetone type, and the like, there is a drawback that the curing mechanism of the former is inferior in curability than those of the latter, even when a metal catalyst is used. On the other hand, in recent years, products that are more environment- and safety-friendly as well as having improved performance are particularly desired from the viewpoint of environmental conservation and health hazard suppression, and there is an increasing demand for dealcoholization-type products having high safety of gas to be desorbed.

As a dealcoholization-type room-temperature-curable organopolysiloxane composition using a catalyst other than a tin catalyst or a titanium catalyst, Patent Document 1 (WO 2014/097574) has reported a dealcoholization-type room-temperature-curable organopolysiloxane composition free of a metal catalyst by introducing an alkoxysilylvinylene bond into a curing agent and using a guanidine-based organic catalyst for a curing catalyst, and has solved these problems, but has a drawback that a method for synthesizing the curing agent is special and therefore the curing agent is expensive.

As another tin alternative method, the use of a bismuth compound has been reported. Patent Document 2 (JP-A 2003-119387) has proposed a silicone composition using a bismuth compound as a catalyst, but has a drawback that the physical property value of the resulting compound changes with time. Further, Patent Document 3 (JP-A 2011-509317) states that chelate-type bismuth catalysts are effective, but these catalysts have a drawback of having a low curing rate and difficulty in procurement.

PRIOR ART DOCUMENTS

Patent Documents

Patent Document 1: WO 2014/097574
Patent Document 2: JP-A 2003-119387
Patent Document 3: JP-A 2011-509317

SUMMARY OF INVENTION

Technical Problem

The present invention has been made in view of the above circumstances, and an object thereof is to provide a room-temperature-curable organopolysiloxane composition for an oil seal, preferably of a dealcoholization type or the like, that has curability and storage stability higher than those of conventional products even with being free of a metal-based catalyst, that is in consideration of toxicity to the human body and environmental aspects, and that is capable of providing a cured product having favorable rubber physical properties, adhesive properties, and engine oil resistance after curing, and an automotive part sealed with a cured product (silicone rubber) obtained by curing the composition.

Solution to Problem

As a result of intensive studies to achieve the above object, the present inventors have found that in a room-temperature-curable organopolysiloxane composition, particularly, in a dealcoholization-type room-temperature-curable organopolysiloxane composition, a room-temperature-curable organopolysiloxane composition obtained by using a hydrolyzable organosilane compound containing a specific organo-oxymethyl group represented by the following general formula (1) and/or a partial hydrolytic condensate thereof as a curing agent (crosslinking agent) and concurrently using an organic compound having a guanidine skeleton as a curing catalyst has performance to solve the above problems, particularly as an oil seal material for automotive engine oil (LLC) or the like, and have completed the present invention.

That is, the present invention provides a room-temperature-curable organopolysiloxane composition for an oil seal, an automotive part sealed with a cured product of the composition, and the like, as described below.

1.

A room-temperature-curable organopolysiloxane composition for an oil seal comprising:
(A) 100 parts by weight of a diorganopolysiloxane having one hydroxyl group and/or one hydrolyzable silyl group bonded to a silicon atom at both ends of the molecular chain and having a viscosity at 23° C. of 20 to 1,000,000 mPa·s;
(B) 1 to 500 parts by weight of an inorganic filler;
(C) 0.1 to 40 parts by weight of a hydrolyzable organosilane compound and/or a partial hydrolytic condensate thereof, the hydrolyzable organosilane compound having the general formula (1) below:

[Chem. 1]

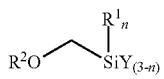

(1)

wherein $R^1$ is each independently an unsubstituted or substituted monovalent hydrocarbon group having 1 to 12 carbon atoms, $R^2$ is an unsubstituted or substituted monovalent hydrocarbon group having 1 to 12 carbon atoms, Y is a hydrolyzable group, and n is 0, 1, or 2;
(D) 0.01 to 5 parts by weight of a silane coupling agent and/or a partial hydrolytic condensate thereof, the silane coupling agent having the general formula (2) below:

$$R^3R^4{}_aSiX_{3-a} \quad (2)$$

wherein $R^3$ is a monovalent hydrocarbon group having 1 to 20 carbon atoms and having at least one functional group containing any one or more atoms selected from a nitrogen atom, a sulfur atom, and an oxygen atom, $R^4$ is an unsubstituted or substituted monovalent hydrocarbon group having 1 to 10 carbon atoms, X is a hydrolyzable group, and a is 0, 1, or 2; and
(E) 0.1 to 5 parts by weight of a curing catalyst consisting of one, or two or more selected from a non-silicon-based organic compound, a hydrolyzable organosilane compound, and a partial hydrolytic condensate thereof, other than the components (C) and (D), having at least one guanidine skeleton in one molecule, the guanidine skeleton having the general formula (3) below:

[Chem. 2]

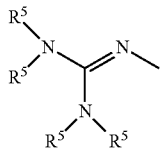

(3)

wherein $R^5$ is each independently a hydrogen atom, an unsubstituted or substituted monovalent hydrocarbon group having 1 to 20 carbon atoms, a methylol group, or a cyano group.

2.

The room-temperature-curable organopolysiloxane composition for an oil seal according to 1, further comprising:
(F) 0.5 to 10 parts by weight of an organodisilazane compound per 100 parts by weight of the component (A), having general the formula (4) below:

[Chem. 3]

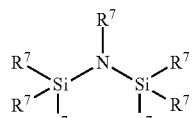

(4)

wherein $R^7$ is each independently a hydrogen atom, an alkyl group having 1 to 3 carbon atoms, or a vinyl group.

3.

The room-temperature-curable organopolysiloxane composition for an oil seal according to 1 or 2, wherein the component (A) is a diorganopolysiloxane having the general formula (5) below:

[Chem. 4]

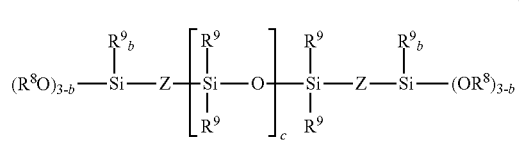

(5)

wherein $R^8$ is each independently a hydrogen atom or a monovalent hydrocarbon group having 1 to 10 carbon atoms, $R^9$ is each independently an unsubstituted or substituted monovalent hydrocarbon group having 1 to 18 carbon atoms, Z is each independently an oxygen atom or an unsubstituted or substituted divalent hydrocarbon group having 1 to 20 carbon atoms, b is 0, 1 or 2, and c is an integer such that a viscosity of the diorganopolysiloxane at 23° C. is 20 to 1,000,000 mPa·s.

4.

The room-temperature-curable organopolysiloxane composition for an oil seal according to any one of 1 to 3, wherein the component (B) is one, or two or more of a surface-treated or untreated inorganic filler selected from a calcium carbonate, an aerosol silica, a precipitated silica, a carbon black, and an aluminum oxide.

5.

The room-temperature-curable organopolysiloxane composition for an oil seal according to any one of 1 to 4, wherein the room-temperature-curable organopolysiloxane composition is free of a metal-based catalyst.

6.

The room-temperature-curable organopolysiloxane composition for an oil seal according to any one of 1 to 5, wherein the room-temperature-curable organopolysiloxane composition is a dealcoholization type.

7.

The room-temperature-curable organopolysiloxane composition for an oil seal according to any one of 1 to 6, wherein the room-temperature-curable organopolysiloxane composition provides a cured product in which a rate of change in rubber physical properties immediately after curing when immersed in engine oil at 150° C. for 240 hours is within ±70% with respect to Durometer type A hardness, within ±50% with respect to tensile strength, and within ±70% with respect to elongation at break.

8.

An automotive part sealed with a cured product of the room-temperature-curable organopolysiloxane composition for an oil seal according to any one of 1 to 7.

Advantageous Effects of Invention

The room-temperature-curable organopolysiloxane composition of the present invention provides a silicone rubber cured product (elastomeric organopolysiloxane cured product) which is excellent in storage stability and curability without using a metal-based catalyst and also has favorable adhesive properties and chemical resistance, and therefore can be suitably used as an oil seal material for automotive engine oil (LLC) and the like.

DESCRIPTION OF EMBODIMENTS

Hereinafter, the present invention is described in detail. Note that, in the present invention, the viscosity is a value measured by a rotational viscometer according to the method specified in JIS Z 8803. Unless otherwise specified, "room temperature" refers to a state of a temperature of 23° C.±5° C. and a humidity of 50% RH±5% RH.

[Component (A)]

A component (A) is diorganopolysiloxane having one silanol group (i.e., a hydroxyl group and/or one hydrolyzable silyl group bonded to a silicon atom) at both ends of the molecular chain, and is a principal component (base polymer) of the organopolysiloxane composition of the present invention.

The molecular structure of the diorganopolysiloxane is not particularly limited, and may be a linear chain or a linear chain having a branched structure. However, the diorganopolysiloxane is preferably a linear diorganopolysiloxane in which both ends of the molecular chain is capped with a diorganohydroxysilyl group or a silyl group having 1 to 3 hydrolyzable groups, for example, a diorganoalkoxysilyl group, an organodialkoxysilyl group, a trialkoxysilyl group, or the like, and the main chain is basically composed of repeating diorganosiloxane units. The linear diorganopolysiloxane may have a small amount of a branched structure.

Further, the diorganopolysiloxane may have a silalkylene structure (—Si—R—Si—) in the middle of the molecular chain (for example, a linking portion between a diorganohydroxysilyl group or a hydrolyzable group-containing silyl group existing at both ends of the molecular chain and the end of the recurring diorganosiloxane units constituting the main chain). In this formula, R is a divalent hydrocarbon group having 1 to 20 carbon atoms, preferably 2 to 6 carbon atoms (for example, a linear or branched alkylene group). In addition, a part or all of hydrogen atoms bonded to the carbon atom of R may be substituted with halogen atoms or cyano groups.

The diorganopolysiloxane as the component (A) has a viscosity at 23° C. of 20 to 1,000,000 mPa·s, preferably 100 to 300,000 mPa·s, more preferably 1,000 to 200,000 mPa·s, particularly preferably 10,000 to 100,000 mPa·s. If the viscosity of the diorganopolysiloxane is less than the above lower limit value (20 mPa·s), a large amount of a component (B) described later is required, and therefore, this is economically disadvantageous. Further, if the viscosity of the diorganopolysiloxane exceeds the above upper limit value (1,000,000 mPa·s), workability is deteriorated, and therefore, this is not preferable. Note that, in the present invention, the viscosity can be measured in most cases by a rotational viscometer (for example, BL type, BH type, BS type, cone-plate type, rheometer, or the like).

The hydrolyzable group included in the diorganopolysiloxane as the component (A) is preferably an alkoxy group or an alkoxy-substituted alkoxy group. The number of hydroxyl groups (silanol groups) and hydrolyzable groups existing at each end of the diorganopolysiloxane is not particularly limited. In a case in which the diorganopolysiloxane has a hydroxyl group (silanol group) at the end, the diorganopolysiloxane preferably has one hydroxyl group bonded to a silicon atom (silanol group) at both ends of the molecular chain (i.e., it exists as a hydroxydiorganosilyl group). In addition, in a case in which the diorganopolysiloxane has an alkoxy group or an alkoxy-substituted alkoxy group at the end as the hydrolyzable group, the diorganopolysiloxane preferably has two or three alkoxy groups bonded to a silicon atom (i.e., the alkoxysilyl group) or alkoxy-substituted alkoxy groups bonded to a silicon atom (i.e., an alkoxyalkoxysilyl group) at both ends of the molecular chain (i.e., it exists as a dialkoxyorganosilyl group or a bis(alkoxyalkoxy) organosilyl group, or a trialkoxysilyl group or a tris(alkoxyalkoxy) silyl group).

Here, the alkoxy group is preferably an alkoxy group having 1 to 10 carbon atoms, particularly 1 to 4 carbon atoms, and examples thereof include a methoxy group, an ethoxy group, a propoxy group, an isopropoxy group, a butoxy group, an isobutoxy group, a sec-butoxy group, a tert-butoxy group, a hexyloxy group, an octyloxy group, and the like. The alkoxy-substituted alkoxy group is preferably an alkoxy-substituted alkoxy group having 2 to 10 carbon atoms in total, particularly 2, 3, or 4 carbon atoms in total, and examples thereof include a methoxymethoxy group, a methoxyethoxy group, an ethoxymethoxy group, and a methoxypropoxy group, and the like. In the present invention, particularly preferred are the diorganopolysiloxane having a hydroxyl group, a methoxy group, or an ethoxy group at both ends thereof.

Examples of the organic group bonded to a silicon atom, other than a hydroxyl group and a hydrolyzable group, include an unsubstituted or substituted monovalent hydrocarbon group having 1 to 18 carbon atoms, preferably 1 to 10 carbon atoms. Exemplary monovalent hydrocarbon groups include: alkyl groups such as a methyl group, an ethyl group, a propyl group, an isopropyl group, a butyl group, an isobutyl group, a sec-butyl group, a tert-butyl group, a pentyl group, a hexyl group, a heptyl group, an octyl group, and a 2-ethylhexyl group; cycloalkyl groups such as a cyclopentyl group and a cyclohexyl group; alkenyl groups such as a vinyl group and an allyl group; aryl groups such as a phenyl group, a tolyl group, a xylyl group, and an α- or β-naphthyl group; aralkyl groups such as a benzyl group, a 2-phenylethyl group, and a 3-phenylpropyl group; and groups in which a part or all of hydrogen atoms bonded to carbon atoms of these groups are substituted with halogen atoms such as fluorine atoms, bromine atoms, or chlorine atoms, or with cyano groups, for example, halogenated monovalent hydrocarbon groups such as a 3,3,3-trifluoropropyl group and a 3-chloropropyl group, and cyanoalkyl groups such as a β-cyanoethyl group and a γ-cyanopropyl group. Among them, preferred is a methyl group.

The diorganopolysiloxane as the above component (A) is particularly preferably a linear diorganopolysiloxane represented by the following general formula (5).

[Chem. 5]

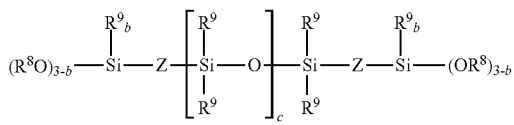

(5)

In the above formula (5), $R^8$ is each independently a group selected from: a hydrogen atom; alkyl groups having 1 to 10 carbon atoms, such as a methyl group, an ethyl group, a propyl group, a butyl group, a hexyl group, and an octyl group; and alkoxy-substituted alkyl groups having 2 to 10 carbon atoms, such as a methoxymethyl group, a methoxyethyl group, an ethoxymethyl group, and a methoxypropyl group. It is preferably a hydrogen atom, a methyl group, or an ethyl group.

$R^9$ is each independently an unsubstituted or substituted monovalent hydrocarbon group having 1 to 18 carbon atoms, preferably 1 to 10 carbon atoms. Examples of this monovalent hydrocarbon group include the above-described organic groups other than the hydroxyl group and the hydrolyzable group, and among them, preferred is a methyl group. b is 0, 1, or 2. In particular, in a case in which $R^8$ is an alkyl group or an alkoxy-substituted alkyl group, b is preferably 0 or 1, and in a case in which $R^8$ is a hydrogen atom, b is preferably 2.

Z is each independently an oxygen atom or an unsubstituted or substituted divalent hydrocarbon group having 1 to 20 carbon atoms, preferably 1 to 6 carbon atoms (preferably an alkylene group). The divalent hydrocarbon group may be linear or may have a branched structure (for example, a methylethylene group), but is preferably a linear alkylene group such as a methylene group, an ethylene group, a propylene group (trimethylene group), a butylene group (tetramethylene group), or a hexylene group (hexamethylene group). Among them, Z is particularly preferably an oxygen atom.

c representing the repeating number (or degree of polymerization) of a disiloxane unit $((R^9)_2SiO_{2/2})$ constituting the main chain in the linear diorganopolysiloxane represented by the above general formula (5) is an integer such that the viscosity of the diorganopolysiloxane at 23° C. is 20 to 1,000,000 mPa·s, preferably 100 to 300,000 mPa·s, more preferably 1,000 to 200,000 mPa·s, and particularly 10,000 to 100,000 mPa·s. In most cases, the c value is an integer of about 10 to 2,000, preferably 20 to 1,500, more preferably 50 to 1,200, and particularly 100 to 1,000.

Note that, in the present invention, the degree of polymerization (or molecular weight) can be determined in most cases as a numerical average degree of polymerization (or numerical average molecular weight) by gel permeation chromatography (GPC) analysis versus polystyrene standards using toluene as a developing solvent (the same applies hereinafter).

Specific examples of the component (A) include the following components.

[Chem. 6]

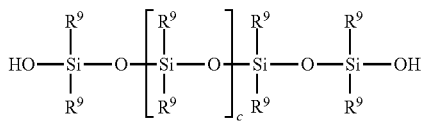

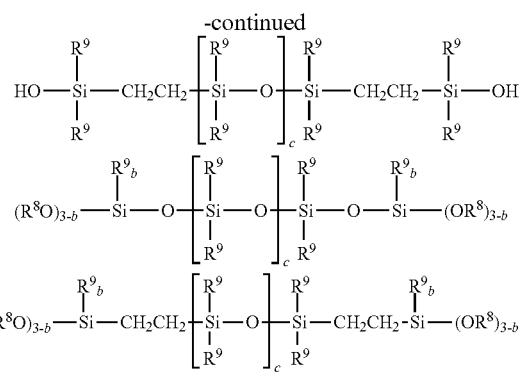

(In each formula, $R^8$, $R^9$, b, and c are the same as described above.)

The diorganopolysiloxane as the component (A) can be produced by a conventionally known method.

The diorganopolysiloxane may be used singly, or two or more of these may be used in combination. In particular, the component (A) preferably contains a diorganopolysiloxane having a hydroxysilyl group at both ends of the molecular chain (i.e., in the above formula (5), a diorganopolysiloxane in which $R^8$ at both ends is a hydrogen atom) in an amount of 10 to 100 parts by weight, more preferably 50 to 100 parts by weight per 100 parts by weight of the component (A).

[Component (B)]

Next, an inorganic filler as the component (B) is a reinforcing and non-reinforcing filler for imparting rubber physical properties to the room-temperature-curable organopolysiloxane composition for an oil seal of the present invention. Exemplary filler include: a surface-treated or untreated silica-based filler of: dry silicas such as baked silica, pulverized silica, molten silica, spherical silica, aerosol silica (fumed silica) and crystalline silica (fine powder quartz), and wet silicas such as precipitated silica and sol-gel method silica; carbon black; talc; bentonite; calcium carbonate, zinc carbonate, magnesium carbonate, which are surface-treated or untreated; calcium oxide, zinc oxide, magnesium oxide, aluminum oxide, aluminum hydroxide, which are surface-treated or untreated. Among them, preferred are calcium carbonate, aerosol silica, precipitated silica, carbon black, and aluminum oxide, and more preferred are calcium carbonate, aerosol silica, precipitated silica, carbon black, and aluminum oxide, which are surface-hydrophobized as the inorganic filler. In this case, these inorganic fillers preferably have a small amount of water content.

Note that the type, amount, method for treatment, and the like of the surface treating agent are not particularly limited, but typically, an organosilicon compound such as a chlorosilane, a alkoxysilane, or an organosilazane, or a treating agent such as a fatty acid, a paraffin, a silane coupling agent, or a titanium coupling agent can be applied.

The inorganic filler as the component (B) may be used singly, or two or more of these may be used in combination.

The compounding amount of the component (B) is in a range of 1 to 500 parts by weight, preferably 20 to 500 parts by weight, more preferably 20 to 300 parts by weight, and particularly preferably 50 to 300 parts by weight per 100 parts by weight of the diorganopolysiloxane as the component (A). If the amount is less than 1 part by weight, sufficient rubber strength cannot be obtained, thus arising a problem of being not suitable for use. If the amount exceeds 500 parts by weight, discharge properties from a cartridge is deteriorated and storage stability is deteriorated as well as mechanical properties of rubber physical properties to be obtained are also deteriorated.

[Component (C)]

The room-temperature-curable organopolysiloxane composition for an oil seal of the present invention is characterized in containing a hydrolyzable organosilane compound that contains an organo-oxymethyl group such as an alkoxymethyl group, bonded to a silicon atom in a molecule represented by the following general formula (1) and/or a partial hydrolytic condensate thereof as a crosslinking agent (curing agent). Note that, in the present invention, the "partial hydrolytic condensate" means an organosiloxane oligomer which is produced by partially hydrolyzing and condensing the hydrolyzable organosilane compound, and has two or more, preferably three or more remaining hydrolyzable groups in the molecule.

[Chem. 7]

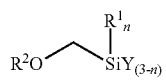

(1)

In the formula, $R^1$ is are each independently an unsubstituted or substituted monovalent hydrocarbon group having 1 to 12 carbon atoms, $R^2$ is an unsubstituted or substituted monovalent hydrocarbon group having 1 to 12 carbon atoms, Y is a hydrolyzable group, and n is 0, 1, or 2.

Here, in the general formula (1), $R^1$ is an unsubstituted or substituted monovalent hydrocarbon group having 1 to 12 carbon atoms, preferably 1 to 8 carbon atoms, and more preferably 1 to 4 carbon atoms. Specifically, alkyl groups such as a methyl group, an ethyl group, a propyl group, an isopropyl group, a butyl group, an isobutyl group, a sec-butyl group, a tert-butyl group, a pentyl group, a hexyl group, a heptyl group, an octyl group, a 2-ethylhexyl group, a nonyl group, a decyl group, and a dodecyl group; cycloalkyl groups such as a cyclopentyl group and a cyclohexyl group; alkenyl groups such as a vinyl group, an allyl group, a propenyl group, an isopropenyl group, a butenyl group, a pentenyl group, and a hexenyl group; aryl groups such as a phenyl group, a tolyl group, a xylyl group, and an α- or β-naphthyl group; aralkyl groups such as a benzyl group, a 2-phenylethyl group, and a 3-phenylpropyl group; and groups in which some or all of hydrogen atoms of these groups are substituted with a halogen atom such as F, Cl, or Br, a cyano group, or the like, for example, a 3-chloropropyl group, a 3,3,3-trifluoropropyl group, and a 2-cyanoethyl group can be exemplified. Among them, preferred are that aliphatic unsaturated hydrocarbon groups such as alkenyl groups are excluded, more preferred are alkyl groups such as a methyl group and an ethyl group, and particularly preferred is a methyl group.

Here, in the general formula (1), $R^2$ is an unsubstituted or substituted monovalent hydrocarbon group having 1 to 12 carbon atoms, preferably 1 to 8 carbon atoms, and more preferably 1 to 4 carbon atoms. Specifically, alkyl groups such as a methyl group, an ethyl group, a propyl group, an isopropyl group, a butyl group, an isobutyl group, a sec-butyl group, a tert-butyl group, a pentyl group, a hexyl group, a heptyl group, an octyl group, a 2-ethylhexyl group, a nonyl group, a decyl group, or a dodecyl group; cycloalkyl groups such as a cyclopentyl group and a cyclohexyl group; alkenyl groups such as a vinyl group, an allyl group, a propenyl group, an isopropenyl group, a butenyl group, a pentenyl group, and a hexenyl group; aryl groups such as a phenyl group, a tolyl group, a xylyl group, and an α- or β-naphthyl group; aralkyl groups such as a benzyl group, a 2-phenylethyl group, and a 3-phenylpropyl group; groups in which some or all of hydrogen atoms of these groups are substituted with a halogen atom such as F, Cl, or Br, a cyano group, or the like, for example, a 3-chloropropyl group, a 3,3,3-trifluoropropyl group, and a 2-cyanoethyl group; and alkyl groups in which some of hydrogen atoms of these groups are substituted with a lower alkoxy group such as a methoxy group or an ethoxy group, for example, a methoxymethyl group, a methoxyethyl group, an ethoxymethyl group, and an ethoxyethyl group can be exemplified. Among them, preferred are lower alkyl groups having 1 to 4 carbon atoms such as a methyl group and an ethyl group.

Further, in the general formula (1), Y represents a hydrolyzable group, and examples thereof include: alkoxy groups having 1 to 4 carbon atoms, such as a methoxy group, an ethoxy group, a propoxy group, an isopropoxy group, a butoxy group, an isobutoxy group, and a tert-butoxy group; alkoxyalkoxy groups having 2 to 4 carbon atoms, such as a methoxyethoxy group, an ethoxyethoxy group, and a methoxypropoxy group; acyloxy groups having 2 to 8 carbon atoms, such as an acetoxy group, an octanoyloxy group, and a benzoyloxy group; alkenyloxy groups having 2 to 6 carbon atoms, such as a vinyloxy group, a propenyloxy group, an isopropenyloxy group, and a 1-ethyl-2-methylvinyloxy group; ketoxime groups having 3 to 7 carbon atoms, such as a dimethylketoxime group, a methylethylketoxime group, and a diethylketoxime group; amino groups having 2 to 6 carbon atoms, such as a dimethylamino group, a diethylamino group, a butylamino group, and a cyclohexylamino group; aminoxy groups having 2 to 6 carbon atoms, such as a dimethylaminoxy group and a diethylaminoxy group; and amide groups having 3 to 8 carbon atoms, such as an N-methylacetamide group, an N-ethylacetamide group, and an N-methylbenzamide group. Among them, particularly preferred are alkoxy groups.

n is 0, 1, or 2, preferably 0 or 1, and more preferably 0.

Specific examples of the hydrolyzable organosilane compound that contains an organo-oxymethyl group, such as an alkoxymethyl group, bonded to a silicon atom in the molecule, and that is represented by the above general formula (1) according to the present invention, and partial hydrolytic condensates thereof include methoxymethyltrimethoxysilane, ethoxymethyltriethoxysilane, methoxymethylmethyldimethoxysilane, ethoxymethylmethyldiethoxysilane, methoxymethylethyldimethoxysilane, ethoxymethylethyldiethoxysilane, methoxymethylhexyldimethoxysilane, ethoxymethylhexyldiethoxysilane, methoxymethyloctyldimethoxysilane, ethoxymethyloctyldiethoxysilane, methoxymethylphenyldimethoxysilane, ethoxymethylphenyldiethoxysilane, and partial hydrolytic condensates thereof.

Note that, the structural formulas of methoxymethyltrimethoxysilane and ethoxymethyltriethoxysilane in the above specific examples are, for example, as follows.

[Chem. 8]

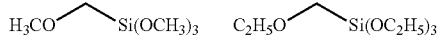

In the room-temperature-curable organopolysiloxane composition for an oil seal of the present invention, the hydrolyzable organosilane compound containing an organo-oxymethyl group and/or a hydrolytic condensate thereof as a component (C) act as a crosslinking agent (curing agent) that forms a crosslinked structure by condensation with a silanol group in the base polymer as the component (A) or by hydrolysis and condensation with a hydrolyzable silyl group in the presence of water such as moisture. The compounding amount of the hydrolyzable organosilane compound and/or the hydrolytic condensate thereof as the component (C) is 0.1 to 40 parts by weight and preferably 0.5 to 10 parts by weight per 100 parts by weight of the diorganopolysiloxane as the component (A). If the amount of the component (B) is too small, sufficient rubber physical properties may not be obtained even when the composition is cured, and if the amount is too large, rapid curability is impaired or it is economically disadvantageous.

Note that the hydrolyzable organosilane compound and/or a hydrolytic condensate thereof as the component (C) are clearly distinguished from a component (E) described later in that they do not have a guanidinyl functional group (guanidine skeleton) in their molecules.

[Component (D)]

Next, a component (D) is a silane coupling agent (i.e., a hydrolyzable organosilane compound having a functional group-containing monovalent hydrocarbon group or a carbon functional silane) represented by the following general formula (2) and/or a partial hydrolytic condensate thereof, and is an essential component for exhibiting favorable adhesive properties to a cured product of the room-temperature-curable organopolysiloxane composition for an oil seal of the present invention.

$$R^3R^4_aSiX_{3-a} \qquad (2)$$

In the formula, $R^3$ is a monovalent hydrocarbon group having 1 to 20 carbon atoms and having at least one functional group containing any one or more atoms selected from a nitrogen atom, a sulfur atom, and an oxygen atom. $R^4$ is an unsubstituted or substituted monovalent hydrocarbon group having 1 to 10 carbon atoms, and X is a hydrolyzable group. a is 0, 1, or 2.

In the above formula (2), $R^3$ is a monovalent hydrocarbon group having 1 to 20 carbon atoms and having at least one functional group containing an atom selected from a nitrogen atom, a sulfur atom, and an oxygen atom (for example, an unsubstituted or substituted amino group, an unsubstituted or substituted imino group, an amide group, a ureido group, a mercapto group, an epoxy group, and an (meth) acryloxy group). Specifically, monovalent hydrocarbon group containing at least one selected from a nitrogen atom, a sulfur atom and an oxygen atom, preferably having 3 to 20 carbon atoms, and particularly preferably having 8 to 14 carbon atoms, such as a β-(2,3-epoxycyclohexyl)ethyl group, a β-(3,4-epoxycyclohexyl)ethyl group, a γ-glycidoxypropyl group, a γ-(meth)acryloxypropyl group, an N-β (aminoethyl)-γ-aminopropyl group, a γ-aminopropyl group, an N-phenyl-γ-aminopropyl group, a γ-ureidopropyl group, a γ-mercaptopropyl group and a γ-isocyanatopropyl group. The functional group containing a nitrogen atom in $R^3$ does not include a guanidinyl functional group essential for the component (E) described later.

Further, $R^4$ is an unsubstituted or substituted monovalent hydrocarbon group having 1 to 10 carbon atoms, preferably 1 to 6 carbon atoms. Preferred is a methyl group, an ethyl group, a propyl group, or an isopropyl group.

In general formula (2), examples of the hydrolyzable group X include a ketoxime group, an alkoxy group, an alkoxy-substituted alkoxy group, an acyloxy group, an alkenyloxy group and the like. Specifically, exemplary hydrolyzable groups X include: ketoxime groups having 3 to 8 carbon atoms, such as a dimethylketoxime group, a diethylketoxime group, a methylethylketoxime group, and a methylisobutylketoxime group; alkoxy groups having 1 to 4, preferably 1 or 2 carbon atoms, such as a methoxy group, an ethoxy group, a propoxy group, an isopropoxy group, a butoxy group, an isobutoxy group, a sec-butoxy group, and a tert-butoxy group; alkoxy-substituted alkoxy groups having 2 to 4 carbon atoms, such as a methoxymethoxy group, a methoxyethoxy group, and a methoxypropoxy group; acyloxy groups having 2 to 4 carbon atoms, such as an acetoxy group and a propionoxy group; and alkenyloxy groups having 2 to 4 carbon atoms, such as a vinyloxy group, an allyloxy group, a propenoxy group, and an isopropenoxy group.

Specific examples of the silane coupling agent as the component (D) include: aminosilanes such as γ-aminopropyltriethoxysilane and 3-2(aminoethylamino)propyltrimethoxysilane; epoxysilanes such as γ-glycidoxypropyltrimethoxysilane and β-(3,4-epoxycyclohexyl)ethyltrimethoxysilane; (meth)acrylsilanes such as γ-(meth)acryloxypropyltrimethoxysilane and γ-(meth)acryloxypropyltriethoxysilane; mercaptosilanes such as γ-mercaptopropyltrimethoxysilane; and isocyanate silanes such as γ-isocyanatopropyltrimethoxysilane.

The silane coupling agent and/or a partial hydrolytic condensate thereof as the component (D) may be used singly, or two or more of these may be used in combination.

The compounding amount of the above component (D) is 0.01 to 5 parts by weight, preferably 0.1 to 4 parts by weight, per 100 parts by weight of the base polymer as the component (A). If the compounding amount is less than 0.01 parts by weight, the cured product does not exhibit sufficient adhesive performance, and if the compounding amount exceeds 5 parts by weight, the rubber strength after curing is deteriorated or curability is deteriorated.

Note that the silane coupling agent and/or a hydrolytic condensate thereof as the component (D) are clearly distinguished from the hydrolyzable organosilane compound and/or a hydrolytic condensate thereof as the above component (C) in that the former is free of an organo-oxy-substituted alkyl group such as an organo-oxymethyl group in the molecule other than the hydrolyzable group, and the silane coupling agent and/or the hydrolytic condensate thereof as the component (D) are also clearly distinguished from the component (E) described later in that the former do not have a guanidinyl functional group (guanidine skeleton) in the molecule other than the hydrolyzable group.

[Component (E)]

The component (E) is one, or two or more selected from a non-silicon-based organic compound, a hydrolyzable organosilane compound, and a partial hydrolytic condensate thereof (hereinafter, the "a hydrolyzable organosilane compound and a partial hydrolytic condensate thereof" are collectively referred to as an organosilicon compound), which have at least one guanidine skeleton in one molecule, other than the components (C) and (D), and acts as a curing catalyst (catalyst component) in the room-temperature-curable organopolysiloxane composition for an oil seal of the present invention, and provides favorable curability and adhesive properties to the composition of the present invention.

Here, having at least one guanidine skeleton in one molecule means including a structure in which one nitrogen atom is bonded by a double bond and two nitrogen atoms are each bonded by a single bond to one carbon atom in the compound, and the structure is represented by the following general formula (3).

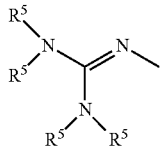

[Chem. 9]

(3)

In the formula, $R^5$ is are each independently a hydrogen atom, an unsubstituted or substituted monovalent hydrocarbon group having 1 to 20 carbon atoms, a methylol group, or a cyano group, preferably a hydrogen atom, an alkyl group having 1 to 4 carbon atoms such as a methyl group or an ethyl group, a methylol group, or a cyano group, and more preferably a hydrogen atom or a methyl group.

Further, the non-silicon-based organic compound and the hydrolyzable organosilane compound in the component (E) are represented by, for example, the following general formula (3').

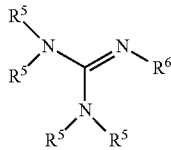

[Chem. 10]

(3')

In the formula, $R^5$ is the same as described above, and $R^6$ is a hydrogen atom, an unsubstituted or substituted monovalent hydrocarbon group having 1 to 20 carbon atoms, a methylol group, a cyano group, or an alkoxysilane residue, preferably a hydrogen atom, an alkyl group having 1 to 4 carbon atoms such as a methyl group or an ethyl group, a methylol group, a cyano group, or an alkoxysilane residue, and more preferably a hydrogen atom, a methyl group, or an alkoxysilane residue. Further, in a case in which $R^5$ or $R^6$ is a hydrogen atom, $R^5$ or $R^6$ may be hydrogen-bonded to an inorganic acid to form a salt.

In the above formulas (3) and (3'), exemplary unsubstituted or substituted monovalent hydrocarbon groups of $R^5$ and $R^6$ include: alkyl groups such as a methyl group, an ethyl group, a propyl group, an isopropyl group, a butyl group, an isobutyl group, a tert-butyl group, a pentyl group, a hexyl group, a heptyl group, an octyl group, a nonyl group, a decyl group, a dodecyl group, and an octadecyl group; cycloalkyl groups such as a cyclopentyl group and a cyclohexyl group; an aryl group such as a phenyl group, a tolyl group, a xylyl group, and an α- or β-naphthyl group; aralkyl groups such as a benzyl group, a 2-phenylethyl group, or a 3-phenylpropyl group; and groups in which some or all of hydrogen atoms of these groups are substituted with a halogen atom such as F, Cl, or Br, a cyano group, or the like, for example, a 3-chloropropyl group, a 3,3,3-trifluoropropyl group and a 2-cyanoethyl group.

In the above formula (3'), the alkoxysilane residue of $R^6$ is represented by the following formula.

-A-Si(OR')$_{3-d}$R"$_d$

In the formula, A is a divalent hydrocarbon group having 1 to 8 carbon atoms, R' and R" are each independently an unsubstituted or substituted monovalent hydrocarbon group having 1 to 12 carbon atoms, and d is 0, 1, or 2.

In the above formula, A is a divalent hydrocarbon group having 1 to 8 carbon atoms, preferably a divalent hydrocarbon group having 2 to 4 carbon atoms, and preferred is an alkylene group of —(CH$_2$)$_p$— (p represents 1 to 8).

Further, R' and R" are each independently an unsubstituted or substituted monovalent hydrocarbon group having 1 to 12 carbon atoms, preferably a monovalent hydrocarbon group having 1 to 8 carbon atoms, more preferably 1 to 4 carbon atoms. Specifically, alkyl groups such as a methyl group, an ethyl group, a propyl group, an isopropyl group, a butyl group, an isobutyl group, a sec-butyl group, a tert-butyl group, a pentyl group, a hexyl group, a heptyl group, an octyl group, a 2-ethylhexyl group, a nonyl group, a decyl group, and a dodecyl group; cycloalkyl groups such as a cyclopentyl group and a cyclohexyl group; alkenyl groups such as a vinyl group, an allyl group, a propenyl group, an isopropenyl group, a butenyl group, a pentenyl group, and a hexenyl group; aryl groups such as a phenyl group, a tolyl group, a xylyl group, and an α- or β-naphthyl group; aralkyl groups such as a benzyl group, a 2-phenylethyl group, and a 3-phenylpropyl group; groups in which some or all of hydrogen atoms of these groups are substituted with a halogen atom such as F, Cl, or Br, a cyano group, or the like, for example, a 3-chloropropyl group, a 3,3,3-trifluoropropyl group, and a 2-cyanoethyl group; and alkyl groups in which some of hydrogen atoms of these groups are substituted with a lower alkoxy group such as a methoxy group or an ethoxy group, for example, a methoxymethyl group, a methoxyethyl group, an ethoxymethyl group, and an ethoxyethyl group can be exemplified. Among them, preferred are lower alkyl groups having 1 to 4 carbon atoms such as a methyl group and an ethyl group.

Specific exemplary non-silicon-based organic compounds having at least one guanidine skeleton in the molecule of the component (E) include: inorganic guanidines such as guanidine hydrochloride, guanidine carbonate, guanidine nitrate, guanidine sulfate and guanidine phosphate; and organic guanidines such as aminoguanidine, 1,1,3,3-tetramethylguanidine, n-dodecylguanidine, methylolguanidine, dimethylolguanidine, 1-phenylguanidine, 1,3-diphenylguanidine, 1,3-di-o-tolylguanidine, triphenylguanidine and 1-benzyl-2,3-dimethylcyanoguanidine. Further, specific exemplary organosilicon compounds include alkoxysilanes such as 1,1,3,3-tetramethyl-2-[3-(trimethoxysilyl)propyl] guanidine, and hydrolytic condensates thereof (siloxanes). Among them, organic guanidines, alkoxysilanes, and hydrolytic condensates thereof are preferably used, and among them, alkoxysilanes such as 1,1,3,3-tetramethyl-2-[3-(trimethoxysilyl)propyl]guanidine and hydrolytic condensates thereof are particularly preferably used.

The guanidine skeleton-containing non-silicon-based organic compound and/or organosilicon compound of the curing catalyst (catalyst component) as the component (E) may be each used singly, or two or more of these may be used in combination.

The non-silicon-based organic compound and/or the organosilicon compound, having at least one guanidine skeleton in one molecule described above are used in a range of 0.1 to 5 parts by weight, preferably 0.2 to 4 parts by weight, more preferably 0.25 to 3 parts by weight, per 100 parts by weight of the organopolysiloxane as the component (A). If the compounding amount is too small, curability of the composition may be deteriorated, and if the compounding amount is too large, odor and storage stability may be deteriorated.

[Component (F)]

The organodisilazane compound as a component (F) is an optional component to be compounded in the composition as needed, and acts as a storage stability improver that provides favorable storage stability to the room-temperature-curable organopolysiloxane composition for an oil seal of the present invention. The storage stability improver component used as the component (F) is an organodisilazane compound represented by the following general formula (4).

[Chem. 11]

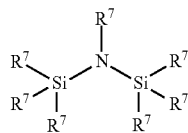

(4)

In the formula, $R^7$ is each independently a hydrogen atom, an alkyl group having 1 to 3 carbon atoms, or a vinyl group.

In the above formula (4), $R^7$ is a hydrogen atom, an alkyl group having 1 to 3 carbon atoms, or a vinyl group, and among them, preferred is a hydrogen atom, a methyl group, or an ethyl group, and more preferred is a hydrogen atom or a methyl group. In addition, $R^7$ may be all the same or different.

Specific exemplary components (F) include hexamethyldisilazane, hexaethyldisilazane, 1,3-divinyl-1,1,3,3-tetramethyldisilazane, 1,3-divinyl-1,1,3,3-tetraethyldisilazane, heptamethyldisilazane, and 1,1,3,3-tetraethyldisilazane. These may be used singly, or two or more of these may be simultaneously used.

In a case in which the component (F) is compounded as the storage stability improver component, the compounding amount thereof is preferably 0.5 to 10 parts by weight and more preferably 1 to 7 parts by weight per 100 parts by weight of the component (A). If the compounding amount is less than 0.5 parts by weight, the storage stability may be deteriorated, and if the compounding amount exceeds 10 parts by weight, the curability of the composition may be deteriorated.

[Other Components]

In addition, for the room-temperature-curable organopolysiloxane composition for an oil seal of the present invention, generally known additives other than the above components may be used as long as the object of the present invention are not impaired. Examples of the additive include a polyether as a thixotropy improver; a silicone oil (a nonfunctional organopolysiloxane), an isoparaffin and the like as a plasticizer; and if needed, coloring agents such as pigment, dye, and a fluorescent brightener; biological active additives such as an mildew-proofing agent, an antibacterial agent, a marine organisms repellent; phenyl-silicone oil and fluoro-silicone oil as bleed oil; surface modifiers such as organic liquids that are incompatible with silicone; and solvents such as toluene, xylene, solvent volatile oil, cyclohexane, methylcyclohexane, and low-boiling isoparaffin can also be added.

Further, a general-purpose dealcoholization-type curing agent such as vinyltrimethoxysilane, phenyltrimethoxysilane, methyltrimethoxysilane, vinyltriethoxysilane, phenyltriethoxysilane, or methyltriethoxysilane can be used in combination as long as curability and storage stability are not impaired.

The room-temperature-curable organopolysiloxane composition for an oil seal of the present invention can be obtained by uniformly mixing the above components, and further, predetermined amounts of the above various additives thereinto, in a dry atmosphere. Further, the room-temperature-curable resin composition for an oil seal of the present invention is cured by being left at room temperature, but as the method for molding, curing conditions, and the like, publicly known methods and conditions in accordance with the type of composition can be adopted.

The room-temperature-curable organopolysiloxane composition for an oil seal of the present invention, especially a one-component composition is easily cured at room temperature (23° C.±5° C.) by being stored in the absence of moisture, that is, in a sealed vessel in which moisture is blocked, and being exposed to moisture in the air at the time of use.

The room-temperature-curable organopolysiloxane composition for an oil seal of the present invention is preferably free of a metal-based catalyst, and is preferably a dealcoholization type. Such a room-temperature-curable organopolysiloxane composition for an oil seal of the present invention exhibits favorable curability and storage stability without using a metal catalyst, and a cured product (silicone rubber) thereof is also excellent in adhesive properties. Further, in the room-temperature-curable organopolysiloxane composition for an oil seal of the present invention, as the inorganic filler as the component (B), 1 part by weight or more, preferably 20 parts by weight or more, more preferably 50 parts by weight or more, and 500 parts by weight or less, and preferably 300 parts by weight or less; as a range, in a range of 1 to 500 parts by weight, preferably 20 to 500 parts by weight, more preferably 20 to 300 parts by weight, and particularly preferably 50 to 300 parts by weight per 100 parts by weight of the component (A); and one type of, or two or more types of surface-treated or untreated inorganic filler selected from calcium carbonate, aerosol silica, precipitated silica, carbon black and aluminum oxide, particularly one type of, or two or more types of surface-treated or untreated calcium carbonate are compounded. In this way, the room-temperature-curable organopolysiloxane composition for an oil seal of the present invention can provide a cured product having a rate of change in rubber physical properties immediately after curing when immersed in engine oil at 150° C. for 240 hours is within ±70% with respect to Durometer type A hardness, within ±50% with respect to tensile strength, and within ±70% with respect to elongation at break.

Therefore, the room-temperature-curable organopolysiloxane composition for an oil seal of the present invention is suitable for an oil seal, and is also useful as an adhesive agent, a sealing material, a coating agent, a potting agent, or the like. A method for using the room-temperature-curable organopolysiloxane composition for an oil seal of the present invention as an adhesive agent, a sealing material, a coating agent, or a potting agent may be according to a conventionally known method.

Examples of the target article include an automotive part, an automotive oil seal, an electrical or electronic part, an electric wire or cable, a structure for building, and a structure for civil engineering work, and the like. In particular, the product of the present invention can be suitably used as an adhesive agent for an automotive part, for example, is useful as an FIPG material.

EXAMPLES

Hereinafter, the present invention is described in more detail with reference to Examples and Comparative Examples, but the present invention is not limited to the following Examples. A viscosity is a value measured by a rotational viscometer at 23° C. according to the method specified in JIS Z 8803.

Example 1

To (A) 100 parts by weight of a linear dimethylpolysiloxane having a viscosity at 23° C. of 20,000 mPa·s, in which both ends of the molecular chain are capped with a silanol group (hydroxyl groups bonded to a silicon atom) (dimethylpolysiloxane in which $R^8$ is a hydrogen atom, $R^9$ is a methyl group, Z is an oxygen atom, b is 2, and c is about 620 in the general formula (5)), (C) 8 parts by weight of methoxymethyltrimethoxysilane and (E) 1 part by weight of 1,1,3,3-tetramethyl-2-[3-(trimethoxysilyl)propyl]guanidine (denoted as guanidine-type organosilane in Table 1) as a catalyst component were added, and mixed under reduced pressure. Next, (B) 80 parts by weight of heavy calcium carbonate whose surface was treated with paraffins (product name; MC COAT P-20, manufactured by Maruo Calcium Co., Ltd.), (B) 20 parts by weight of colloidal calcium carbonate whose surface was treated with a fatty acid (product name; CARLEX 300, manufactured by Maruo Calcium Co., Ltd.), and (B) 10 parts by weight of carbon black (product name; DENKA BLACK Li-100, manufactured by Denka Company Limited) were added and sufficiently mixed, and then (D) 1 part by weight of γ-aminopropyltrimethoxysilane (product name; KBM-903, manufactured by Shin-Etsu Chemical Co., Ltd.) was added thereto, thereafter the resulting mixture was thoroughly mixed under reduced pressure to give a composition 1.

Example 2

To (A) 100 parts by weight of a linear dimethylpolysiloxane having a viscosity at 23° C. of 20,000 mPa·s, in which both ends of the molecular chain are capped with a silanol group (dimethylpolysiloxane in which $R^8$ is a hydrogen atom, $R^9$ is a methyl group, Z is an oxygen atom, b is 2, and c is about 620 in the general formula (5)), (C) 8 parts by weight of methoxymethyltrimethoxysilane and (E) 1 part by weight of 1,1,3,3-tetramethyl-2-[3-(trimethoxysilyl)propyl]guanidine as a catalyst component were added, and mixed under reduced pressure. Next, (B) 80 parts by weight of heavy calcium carbonate whose surface was treated with paraffins (product name; MC COAT P-20, manufactured by Maruo Calcium Co., Ltd.), (B) 20 parts by weight of colloidal calcium carbonate whose surface was treated with a fatty acid (product name; CARLEX 300, manufactured by Maruo Calcium Co., Ltd.), and (B) 10 parts by weight of carbon black (product name; DENKA BLACK Li-100, manufactured by Denka Company Limited) were added and sufficiently mixed, and then (D) 1 part by weight of γ-aminopropyltrimethoxysilane (product name; KBM-903, manufactured by Shin-Etsu Chemical Co., Ltd.) and (F) 2 parts by weight of hexamethyldisilazane as a storage stability improver component were added thereto, thereafter the resulting mixture was thoroughly mixed under reduced pressure to give a composition 2.

Example 3

To (A) 100 parts by weight of a linear dimethylpolysiloxane having a viscosity at 23° C. of 20,000 mPa·s, in which both ends of the molecular chain are capped with a silanol group (dimethylpolysiloxane in which $R^8$ is a hydrogen atom, $R^9$ is a methyl group, Z is an oxygen atom, b is 2, and c is about 620 in the general formula (5)), (C) 5 parts by weight of methoxymethyltrimethoxysilane, 3 parts by weight of vinyltrimethoxysilane, and (E) 1 part by weight of 1,1,3,3-tetramethyl-2-[3-(trimethoxysilyl)propyl]guanidine as a catalyst component were added, and mixed under reduced pressure. Next, (B) 80 parts by weight of heavy calcium carbonate whose surface was treated with paraffins (product name; MC COAT P-20, manufactured by Maruo Calcium Co., Ltd.), (B) 20 parts by weight of colloidal calcium carbonate whose surface was treated with a fatty acid (product name; CARLEX 300, manufactured by Maruo Calcium Co., Ltd.), and (B) 10 parts by weight of carbon black (product name; DENKA BLACK Li-100, manufactured by Denka Company Limited) were added and sufficiently mixed, and then (D) 1 part by weight of γ-aminopropyltrimethoxysilane (product name; KBM-903, manufactured by Shin-Etsu Chemical Co., Ltd.) and (F) 2 parts by weight of hexamethyldisilazane as a storage stability improver component were added thereto, thereafter the resulting mixture was thoroughly mixed under reduced pressure to give a composition 3.

Example 4

To (A) 100 parts by weight of a linear dimethylpolysiloxane having a viscosity at 23° C. of 20,000 mPa·s, in which both ends of the molecular chain are capped with a trimethoxysilyl group (dimethylpolysiloxane in which $R^8$ and $R^9$ are each a methyl group, Z is an oxygen atom, b is 0, and c is about 630 in the general formula (5)), (C) 8 parts by weight of methoxymethyltrimethoxysilane and (E) 1 part by weight of 1,1,3,3-tetramethyl-2-[3-(trimethoxysilyl)propyl]guanidine as a catalyst component were added, and mixed under reduced pressure. Next, (B) 80 parts by weight of heavy calcium carbonate whose surface was treated with paraffins (product name; MC COAT P-20, manufactured by Maruo Calcium Co., Ltd.), (B) 20 parts by weight of colloidal calcium carbonate whose surface was treated with a fatty acid (product name; CARLEX 300, manufactured by Maruo Calcium Co., Ltd.), and (B) 10 parts by weight of carbon black (product name; DENKA BLACK Li-100, manufactured by Denka Company Limited) were added and sufficiently mixed, and then (D) 1 part by weight of γ-aminopropyltrimethoxysilane (product name; KBM-903, manufactured by Shin-Etsu Chemical Co., Ltd.) and (F) 2 parts by weight of hexamethyldisilazane as a storage stability improver component were added thereto, thereafter the resulting mixture was thoroughly mixed under reduced pressure to give a composition 4.

Example 5

To (A) 100 parts by weight of a linear dimethylpolysiloxane having a viscosity at 23° C. of 20,000 mPa·s, in which both ends of the molecular chain are capped with a trimethoxysilylethylene group (dimethylpolysiloxane in which $R^8$ and $R^9$ are each a methyl group, Z is $CH_2CH_2$, b is 0, and c is about 630 in the general formula (5)), (C) 8 parts by weight of methoxymethyltrimethoxysilane and (E) 1 part by weight of 1,1,3,3-tetramethyl-2-[3-(trimethoxysilyl)propyl]guanidine as a catalyst component were added, and mixed under reduced pressure. Next, (B) 80 parts by weight of heavy calcium carbonate whose surface was treated with paraffins (product name; MC COAT P-20, manufactured by Maruo Calcium Co., Ltd.), (B) 20 parts by weight of colloidal calcium carbonate whose surface was treated with a fatty acid (product name; CARLEX 300, manufactured by Maruo Calcium Co., Ltd.), and (B) 10 parts by weight of carbon black (product name; DENKA BLACK Li-100, manufactured by Denka Company Limited) were added and sufficiently mixed, and then (D) 1 part by weight of γ-aminopropyltrimethoxysilane (product name; KBM-903, manufactured by Shin-Etsu Chemical Co., Ltd.) and (F) 2 parts by weight of hexamethyldisilazane as a storage stability improver component were added thereto, thereafter the resulting mixture was thoroughly mixed under reduced pressure to give a composition 5.

Comparative Example 1

To (A) 100 parts by weight of a linear dimethylpolysiloxane having a viscosity at 23° C. of 20,000 mPa·s, in which both ends of the molecular chain are capped with a silanol group, 8 parts by weight of vinyltrimethoxysilane and (E) 1 part by weight of 1,1,3,3-tetramethyl-2-[3-(trimethoxysilyl)propyl]guanidine as a catalyst component were added, and mixed under reduced pressure. Next, (B) 80 parts by weight of heavy calcium carbonate whose surface was treated with paraffins (product name; MC COAT P-20, manufactured by Maruo Calcium Co., Ltd.), (B) 20 parts by weight of colloidal calcium carbonate whose surface was treated with a fatty acid (product name; CARLEX 300, manufactured by Maruo Calcium Co., Ltd.), and (B) 10 parts by weight of carbon black (product name; DENKA BLACK Li-100, manufactured by Denka Company Limited) were added and sufficiently mixed, and then (D) 1 part by weight of γ-aminopropyltrimethoxysilane (product name; KBM-903, manufactured by Shin-Etsu Chemical Co., Ltd.) and (F) 2 parts by weight of hexamethyldisilazane as a storage stability improver component were added thereto, thereafter the resulting mixture was thoroughly mixed under reduced pressure to give a composition 6.

Comparative Example 2

To (A) 100 parts by weight of a linear dimethylpolysiloxane having a viscosity at 23° C. of 20,000 mPa·s, in which both ends of the molecular chain are capped with a silanol group, 8 parts by weight of vinyltrimethoxysilane and (E) 1 part by weight of 1,1,3,3-tetramethyl-2-[3-(trimethoxysilyl)propyl]guanidine as a catalyst component were added, and mixed under reduced pressure. Next, (B) 80 parts by weight of heavy calcium carbonate whose surface was treated with paraffins (product name; MC COAT P-20, manufactured by Maruo Calcium Co., Ltd.), (B) 20 parts by weight of colloidal calcium carbonate whose surface was treated with a fatty acid (product name; CARLEX 300, manufactured by Maruo Calcium Co., Ltd.), and (B) 10 parts by weight of carbon black (product name; DENKA BLACK Li-100, manufactured by Denka Company Limited) were added and sufficiently mixed, and then (D) 1 part by weight of γ-aminopropyltrimethoxysilane (product name; KBM-903, manufactured by Shin-Etsu Chemical Co., Ltd.), 0.5 parts by weight of dioctyltin dilaurate, and (F) 2 parts by weight of hexamethyldisilazane as a storage stability improver component were added thereto, thereafter the resulting mixture was thoroughly mixed under reduced pressure to give a composition 7.

Comparative Example 3

To (A) 100 parts by weight of a linear dimethylpolysiloxane having a viscosity is at 23° C. of 20,000 mPa·s, in which both ends of the molecular chain are capped with a trimethoxysilyl group, (B) 80 parts by weight of heavy calcium carbonate whose surface was treated with paraffins (product name; MC COAT P-20, manufactured by Maruo Calcium Co., Ltd.), (B) 20 parts by weight of colloidal calcium carbonate whose surface was treated with a fatty acid (product name; CARLEX 300, manufactured by Maruo Calcium Co., Ltd.), and (B) 10 parts by weight of carbon black (product name; DENKA BLACK Li-100, manufactured by Denka Company Limited) were added and sufficiently mixed, and then (D) 0.5 parts by weight of γ-aminopropyltrimethoxysilane (product name; KBM-903, manufactured by Shin-Etsu Chemical Co., Ltd.), and 4 parts by weight of titanium ethyl acetoacetate (product name ORGATIX TC-750, manufactured by Matsumoto Fine Chemical Co., Ltd.) were thoroughly mixed under reduced pressure to give a composition 8.

[Test Method]
(Initial Evaluation)

As an initial evaluation, the composition immediately after the above preparation was used to evaluate the following tack free time, curing rate, initial sealing performance, rubber physical properties, and adhesive properties.

Tack Free Time

Using the compositions (room-temperature-curable organopolysiloxane compositions) prepared in the above Examples and Comparative Examples, the tack free time (tacky dry time) was measured according to the method specified in JIS K 6249.

Curing Rate

As a test method of curing rates, a glass petri dish having an inner diameter of 10 mm was filled with each of the compositions prepared in the above Examples and Comparative Examples, and after leaving each of the composition at 23° C. and 50% RH for one day (24 hours), the thickness cured from the portion exposed to air was measured.

Initial Sealing Performance

As a test method of initial sealing performance (pressure resistance), a pressure resistance test was performed using a pressure vessel similar to a flange pressure vessel for pressure resistance tests specified in JIS K 6820 as a test apparatus. The pressure vessel includes an upper vessel having an upper flange with an inner diameter of 58 mm, an outer diameter of 80 mm, and a thickness of 10 mm, and a lower vessel having a lower flange with the dimensions identical to those of the upper flange. An annular notch having a width of 3 mm and a depth of 3 mm is provided along the circumference at an inner side edge portion of a sealing surface of the lower flange. This sealing surface of the lower flange was washed with toluene. Thereafter, the above compositions were each applied in a bead formation to the central portion of the lower sealing surface in an application amount sufficient to fill the sealing surface. Immediately after the application, the upper vessel was placed on the lower vessel such that the upper flange and the sealing surface of the lower flange were in contact with each other, and iron spacers having a height of 20.50 mm (in the thickness direction of the above flange) for defining the distance between the sealing surfaces of the upper and lower flanges was installed, and four fastening bolts were assembled. An interval of 0.5 mm is generated between the sealing surfaces by the spacer, but this is for making the pressure resistance test on the sealing materials more severe, that is, for implementing the pressure resistance test as a so-called acceleration test. Thereafter, after curing the compositions at 23° C. and 50% RH for 30 minutes, gas was inserted from the upper pressurizing port, and the gas pressure that the sealing materials as the cured products of the above compositions can withstand was measured.

Rubber Physical Properties

The compositions prepared in the above Examples and Comparative Examples were each poured into a 2 mm-sized mold and cured at 23° C. and 50% RH for seven days to give a rubber sheet having a thickness of 2 mm. Rubber physical properties (Durometer type A hardness, tensile strength, and elongation at break) were measured according to the method specified in JIS K 6249.

Adhesive Properties

Each of the compositions prepared in the above Examples and Comparative Examples was cured between two aluminum plates having a width of 25 mm and a length of 100 mm at 23° C. and 50% RH for seven days to form a silicone rubber cured product layer having an adhesion area of 2.5 cm$^2$ and an adhesion thickness of 1 mm with each of the upper and lower aluminum plates, whereby shear bond test specimens were produced. Using each of the test specimens, the shear bond force and the cohesive failure ratio with respect to aluminum were measured according to the method specified in JIS K 6249, and then the cohesive failure ratios were compared.

(Acceleration Test)

In addition, in each of the tests (tack free time, curing rate, initial sealing performance, rubber physical properties, adhesive properties), the compositions prepared in the above Examples and Comparative Examples were each sealed in a polyethylene vessel, and the compositions in a case in which an acceleration deterioration test was also implemented for seven days in a dryer at 70° C. were also evaluated. Note that, in the physical property measurement test, a sample exhibiting physical properties of, in both the initial and after acceleration tests, tack free time of 10 minutes or less, a curing rate of 1.5 mm/24 hours or more, initial sealing performance of 100 kPa or more, hardness of 30 or more, tensile strength of 1.5 MPa or more, elongation at break of 200% or more, shear bond strength of 1.0 MPa or more, and a cohesive failure ratio of 90% or more was evaluated to be acceptable (○), and a sample deviating from these physical properties was evaluated to be unacceptable (x).

(Chemical Resistance Test)

To confirm chemical resistance (engine oil resistance) performance, the obtained cured silicone rubber sheets and shear bond test specimens were immersed in engine oil [trade name: Toyota Castle Oil SN 0W-20], deteriorated them at 150° C. for 240 hours, and then subjected to the same test as in the initial stage of production (rubber physical properties and adhesive properties) to implement a confirmation test of chemical resistance.

The above results are indicated in Table 1.

Note that the numerical values in parentheses in the columns after the chemical resistance test of the Durometer type A hardness, tensile strength, and elongation at break in Table 1 indicate the rate of change from the initial (immediately-after-curing) rubber physical properties (i.e., {(rubber physical property value after chemical resistance test)−(initial rubber physical property value)}/(initial rubber physical property value)×100(%)).

TABLE 1

|  |  |  | Example ||||| Comparative Example |||
|---|---|---|---|---|---|---|---|---|---|---|
|  |  |  | 1 | 2 | 3 | 4 | 5 | 1 | 2 | 3 |
| Compounding amount (parts by weight) | (A) | Silanol end-capped dimethylpolysiloxane | 100 | 100 | 100 |  |  | 100 | 100 |  |
|  |  | Trimethoxysilyl end-capped dimethylpolysiloxane |  |  |  | 100 |  |  |  | 100 |
|  |  | Trimethoxysilylethylene end-capped dimethylpolysiloxane |  |  |  |  | 100 |  |  |  |
|  | (B) | Ground calcium carbonate | 80 | 80 | 80 | 80 | 80 | 80 | 80 | 80 |
|  |  | Colloidal calcium carbonate | 20 | 20 | 20 | 20 | 20 | 20 | 20 | 20 |
|  |  | Carbon black | 10 | 10 | 10 | 10 | 10 | 10 | 10 | 10 |
|  | (C) | Methoxymethyltrimethoxysilane | 8 | 8 | 5 | 8 | 8 |  |  |  |
|  | (C') | Vinyltrimethoxysilane |  |  | 3 |  |  | 8 | 8 |  |
|  | (D) | γ-aminopropyltrimethoxysilane | 1 | 1 | 1 | 1 | 1 | 1 | 1 | 0.5 |
|  | (E) | Guanidine-type organosilane | 1 | 1 | 1 | 1 | 1 | 1 | 1 |  |
|  | (E') | Dioctyltin dilaurate |  |  |  |  |  |  | 0.5 |  |
|  |  | Titanium ethyl acetoacetate |  |  |  |  |  |  |  | 4 |
|  | (F) | Hexamethyldisilazane |  | 2 | 2 | 2 | 2 | 2 | 2 |  |
| Evaluation result | Tack free time (min) | Initial stage | 4 | 4 | 6 | 5 | 5 | 6 | 5 | 10 |
|  |  | After acceleration test | 5 | 4 | 7 | 5 | 5 | 6 | 8 | 10 |
|  | Curing rate (mm/24 h) | Initial stage | 2.1 | 2.2 | 1.9 | 2.2 | 2.1 | 1.8 | 1.9 | 1.5 |
|  |  | After acceleration test | 2.0 | 2.4 | 1.9 | 2.2 | 2.3 | 2.3 | 2.4 | 1.5 |
|  | Initial sealing performance (kPa) | Initial stage | 330 | 330 | 160 | 210 | 240 | 80 | 130 | 20 |
|  |  | After acceleration test | 270 | 310 | 140 | 180 | 200 | 60 | 20 | 20 |
|  | Hardness (Durometer type A) | Initial stage | 55 | 56 | 55 | 58 | 59 | 54 | 57 | 51 |
|  |  | After acceleration test | 53 | 56 | 53 | 56 | 58 | 42 | 18 | 48 |
|  |  | After chemical resistance test | 21 (−62) | 22 (−61) | 22 (−60) | 26 (−55) | 27 (−54) | 22 (−59) | 24 (−58) | 10 (−80) |
|  | Tensile strength (Mpa) | Initial stage | 2.1 | 2.2 | 2.2 | 2.2 | 2.3 | 2.1 | 2.2 | 1.8 |
|  |  | After acceleration test | 2.1 | 2.2 | 2.2 | 2.1 | 2.2 | 1.6 | 0.8 | 1.8 |
|  |  | After chemical resistance test | 2.1 (0) | 2.1 (−4.5) | 2.0 (−9.0) | 2.1 (−4.5) | 1.9 (−17) | 1.8 (−14) | 1.9 (−14) | 0.9 (−50) |
|  | Elongation at break (%) | Initial stage | 290 | 280 | 250 | 240 | 260 | 250 | 250 | 310 |
|  |  | After acceleration test | 320 | 260 | 310 | 270 | 260 | 360 | 260 | 310 |
|  |  | After chemical resistance test | 400 (38) | 390 (39) | 380 (52) | 360 (50) | 380 (46) | 260 (4.0) | 290 (16) | 602 (94) |

TABLE 1-continued

| | | Example | | | | | Comparative Example | | |
|---|---|---|---|---|---|---|---|---|---|
| | | 1 | 2 | 3 | 4 | 5 | 1 | 2 | 3 |
| Shear bond strength (MPa) | Initial stage | 1.6 | 1.5 | 1.5 | 1.5 | 1.6 | 1.4 | 1.5 | 1.3 |
| | After acceleration test | 1.4 | 1.6 | 1.6 | 1.4 | 1.4 | 1.1 | 0.6 | 1.2 |
| | After chemical resistance test | 1.2 | 1.1 | 1.3 | 1.2 | 1.4 | 1.2 | 1.3 | 0.6 |
| Cohesive failure ratio (%) | Initial stage | 100 | 100 | 100 | 100 | 100 | 100 | 100 | 100 |
| | After acceleration test | 100 | 100 | 100 | 100 | 100 | 100 | 0 | 60 |
| | After chemical resistance test | 100 | 100 | 100 | 100 | 100 | 100 | 100 | 50 |

The above results indicate that the composition of the present invention has more favorable curability (tack free time, curing rate, initial sealing performance), rubber physical properties, and adhesive properties than those at the initial stage, and also has favorable storage stability since the indicated physical properties after the acceleration test are equivalent to those at the initial stage. Among them, Examples 2, 3, 4, and 5 each containing a curing agent containing an alkoxymethyl group and a storage stability improver component (hexamethyldisilazane) resulted in particularly excellent storage stability. On the other hand, Comparative Example 1 in which a guanidine-type organosilane was used as a curing catalyst and a curing agent free of an alkoxymethyl group was used, and Comparative Example 3 free of the components (C) and (C'), in which a guanidine-type organosilane was not used as a curing catalyst and a titanium catalyst was used had poor curability, and Comparative Example 2 in which a curing agent free of an alkoxymethyl group was used and a guanidine-type organosilane and a tin catalyst were used in combination as a curing catalyst resulted in significant changes in physical properties after storage. Further, Comparative Example 3 using the titanium catalyst resulted in inferior chemical resistance in comparison with the others.

It can be confirmed from the above results that the dealcoholization-type room-temperature-curable organopolysiloxane composition for an oil seal of the present invention has favorable physical properties, curability, adhesive properties, storage stability, and chemical resistance (oil resistance) despite not using a metal catalyst, and it can be seen that the composition can be suitably used as an automotive oil seal.

The invention claimed is:
1. A room-temperature-curable organopolysiloxane composition for an oil seal, comprising:
(A) 100 parts by weight of a diorganopolysiloxane having one hydroxyl group and/or one hydrolyzable sily group bonded to a silicon atom at both ends of the molecular chain and having a viscosity at 23° C. of 20 to 1,000,000 mPa s;
(B) 1 to 500 parts by weight of an inorganic filler;
(C) 0.1 to 40 parts by weight of a hydrolyzable organosilane compound and/or a partial hydrolytic condensate thereof, the hydrolyzable organosilane compound having the general formula (1) below:

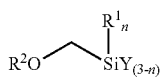

(1)

wherein $R^1$ is each independently an unsubstituted or substituted monovalent hydrocarbon group having 1 to 12 carbon atoms, $R^2$ is an unsubstituted or substituted monovalent hydrocarbon group having 1 to 12 carbon atoms, Y is a hydrolyzable group, and n is 0, 1, or 2;

(D) 0.01 to 5 parts by weight of a silane coupling agent and/or a partial hydrolytic condensate thereof, the silane coupling agent having the general formula (2) below:

(2)

wherein $R^3$ is a monovalent hydrocarbon group having 1 to 20 carbon atoms and having at least one functional group containing any one or more atoms selected from a nitrogen atom, a sulfur atom, an oxygen atom, $R^4$ is an unsubstituted or substituted monovalent hydrocarbon group having 1 to 10 carbon atoms, X is a hydrolyzable group, and a is 0, 1, or 2; and (E) 0.1 to 5 parts by weight of a curing catalyst consisting of one, or two or more selected from a non-silicon-based organic compound, a hydrolyzable organosilane compound, and a partial hydrolytic condensate thereof, other than the components (C) and (D), having at least one guanidine skeleton in one molecule, the guanidine skeleton having the general formula (3) below:

(3)

wherein $R^5$ is each independently a hydrogen atom, an unsubstituted or substituted monovalent hydrocarbon group having 1 to 20 carbon atoms, a methylol group, or a cyano group, and wherein the room-temperature-curable composition is free of a metal-based catalyst and is a dealcoholization type.

2. The room-temperature-curable organopolysiloxane composition for an oil seal according to claim 1, further comprising:
(F) 0.5 to 10 parts by weight of an organodisilazane compound per 100 parts by weight of the component (A), having the general formula (4) below:

(4)

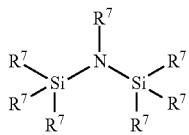

wherein $R^7$ is each independently a hydrogen atom, an alkyl group having 1 to 3 carbon atoms, or a vinyl group.

3. The room-temperature-curable organopolysiloxane composition for an oil seal according to claim 1, wherein the component (A) is a diorganopolysiloxane having the general formula (5) below:

(5)

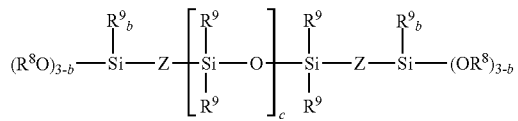

wherein $R^8$ is each independently a hydrogen atom or a monovalent hydrocarbon group having 1 to 10 carbon atoms, $R^9$ is each independently an unsubstituted or substituted monovalent hydrocarbon group having 1 to 18 carbon atoms, Z is each independently an oxygen atom or an unsubstituted or substituted divalent hydrocarbon group having 1 to 20 carbon atoms, b is 0, 1 or 2, and c is an integer such that a viscosity of the diorganopolysiloxane at 23° C. is 20 to 1,000,000 mPa·s.

4. The room-temperature-curable organopolysiloxane composition for an oil seal according to claim 1, wherein the component (B) is one, or two or more of a surface-treated or untreated inorganic filler selected from a calcium carbonate, an aerosol silica, a precipitated silica, a carbon black, and an aluminum oxide.

5. An automotive part sealed with a cured product of the room-temperature-curable organopolysiloxane composition for an oil seal according to claim 1.

\* \* \* \* \*